United States Patent

Hutton et al.

[11] 3,969,319
[45] July 13, 1976

[54] STABILIZATION OF HALOGEN-CONTAINING POLYMERS

[75] Inventors: Ronald Eric Hutton, Southport; Vincent Oakes, St. Helens; Brian Rodney Iles, Liverpool, all of England

[73] Assignee: Akzo N.V., Arnhem, Netherlands

[22] Filed: Nov. 29, 1974

[21] Appl. No.: 528,549

[30] Foreign Application Priority Data
Nov. 30, 1973 United Kingdom............... 55549/73

[52] U.S. Cl............................ 260/45.75 S; 252/406; 260/45.75 K; 260/45.75 J; 260/45.75 T
[51] Int. Cl.².............................................. C08J 3/20
[58] Field of Search............... 260/45.75 J, 45.75 K, 260/45.75 S, 45.75 T; 252/406

[56] References Cited
UNITED STATES PATENTS

| | | | |
|---|---|---|---|
| 2,727,917 | 12/1955 | Mack et al.................... | 260/45.75 |
| 2,731,484 | 1/1956 | Best............................... | 260/45.75 |
| 2,744,876 | 5/1956 | Ramsden...................... | 260/45.75 |
| 2,789,994 | 4/1957 | Ramsden...................... | 260/45.75 |
| 2,790,785 | 4/1957 | Ramsden...................... | 260/45.75 |
| 2,798,862 | 7/1957 | Tomka et al.................. | 260/45.75 |
| 2,872,468 | 2/1959 | Leistner et al............... | 260/45.75 |
| 2,883,363 | 4/1959 | Leistner et al............... | 260/45.75 |
| 2,885,415 | 5/1959 | Ramsden...................... | 260/45.75 |
| 2,914,506 | 11/1959 | Mack............................. | 260/45.75 |
| 3,021,302 | 2/1962 | Frey.............................. | 260/45.75 |
| 3,115,509 | 12/1963 | Mack............................. | 260/45.75 |
| 3,208,969 | 9/1965 | Quattlebaum................ | 260/45.75 |
| 3,398,114 | 8/1968 | Pollock......................... | 260/45.75 |
| 3,424,717 | 1/1969 | Gottlieb et al............... | 260/45.95 |
| 3,518,223 | 6/1970 | Fath et al...................... | 260/45.75 |
| 3,640,950 | 2/1972 | Weisfeld....................... | 260/45.75 |

*Primary Examiner*—V. P. Hoke
*Attorney, Agent, or Firm*—Stevens, Davis, Miller & Mosher

[57] ABSTRACT

Improved heat stability of halogen containing polymers is obtained by applying as stabilizer a synergistic mixture of a. An organotinstabilizer of the formula $R_xSn Z_{(4-x)}$ and
b. A second organotinstabilizer having one of the following formulae

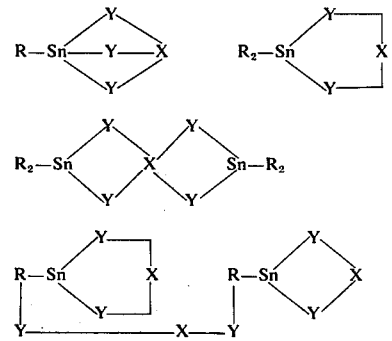

where $x$ may be 1, 2 or 3, X represents the residue of a polyol containing from 2 to 6 hydroxylgroups; Y represents oxygen or sulphur; Z represents one of the following anions: $-S(CH_2)_nCOOR^*$ where $n=1$ or 2,

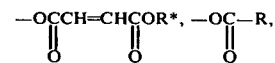

—SR and >S and in addition when $x=2$

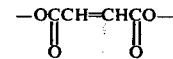

and $-S(CH_2)_nCOO-$;
R represents an alkyl group containing 1–18 carbon atoms, a cycloalkyl group, an aryl group, an aralkyl or alkaryl group and
R* represents the groups represented by R or the residue of a polyol containing from 2 to 6 hydroxylgroups.

8 Claims, No Drawings

STABILIZATION OF HALOGEN-CONTAINING POLYMERS

BACKGROUND OF THE INVENTION

This invention relates to halogen-containing polymers. More particularly this invention relates to the stabilization of such polymers against deterioration caused by heat, light or mechanical processing.

Polymers and copolymers of vinyl chloride are thermoplastics which contain labile chlorine atoms which are unstable to heat. Therefore when such polymers are heated during normal fabricating processes, such as extrusion, calendering and injection moulding, they tend to decompose fairly rapidly with the evolution of hydrogen chloride gas. The evolution of hydrogen chloride gas is accompanied by unsaturation being formed on the polymer backbone and the resulting polyene as it is built-up, causes the characteristic colour change on degradation through yellow, through amber, through black. This change in colour is accompanied by loss in mechanical properties. This problem has been overcome by the plastics industry by the addition of small quantities of additives to achieve acceptable stability such that the polymer may be processed.

A wide variety of materials have been proposed as stabilisers for polyvinylchloride, and several distinct classes of compound have emerged. For example basic inorganic lead salts form one class which although cheap and effective have the disadvantages of high toxicity, high opacity, and a tendancy to stain in industrial atmospheres. Metal soaps of metals of groups two and three of the periodic classification form another class of compounds which are widely used in complex formulations together with epoxy compounds, antioxidants and chelators. This class of compound is used in many applications and can if required produce clear polyvinylchloride. However the heat stability imparted by this class of compound is still limited and new disadvantages are introduced such as poor plateout. The most powerful class of polyvinylchloride stabiliser to emerge are organotin compounds. Of particular value are the dialkyltin compounds, particularly when combined with a mercaptide anion.

Typical of the organotin stabilisers in wide use in industry today are dibutyltin bis lauryl mercaptide and dibutyltin bis iso-octyl thioglycollate. The latter compound has enjoyed wide use in industry for many years.

In recent years however, the trend towards higher output rates from a given piece of equipment together with new processing techniques involving high temperatures and high mechanical shear have exposed the limitations of such organotin stabilisers.

SUMMARY OF THE INVENTION

According to the present invention there is provided a stabilizer composition for improving the stability of halogen-containing polymers which comprises:

a. at least one organotin compound of the formula $R_x Sn Z_{(4-x)}$
wherein:
  $x$ may be 1, 2 or 3
  Z represents $-S(CH_2)_n COOR^*$ where $n = 1$ or 2, $-OOCCH=CHCOOR^*$; $-OCOR$, $-SR$ or $>S$
  and in addition when $x=2$, Z may be $-S(CH_2)_n COO-$ or $-OOCCH=CHCOO-$.

R represents an alkyl group containing 1 to 18 carbon atoms, a cycloalkyl group, an aryl group, an aralkyl or alkaryl group.
R* represents the groups represented by R or the residue of a polyol containing from 2 to 6 hydroxyl groups, and, b. At least one organotin compound having one of the following formulae:

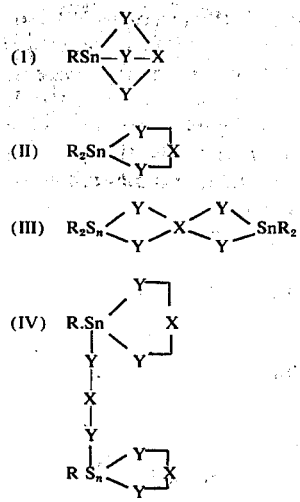

where
R has the same meaning as above,
X represents the residue of a polyol containing 2–6 hydroxyl groups which residue may contain ether, ester alkene, amide or sulphide groups.
Y represents oxygen or sulphur
and in which composition the ratio by weight of (a):(b) is from 50:1 to 1:4.

When there is more than one symbol of the same type in any one of the above formulae then the groups so symbolized may be the same or different.

In a preferred embodiment of the present invention, the stabilizer composition will be composed such that one of the two stabilizers (a) and (b) is a monoalkyltin derivative and the other stabilizer is a dialkyltin derivative.

In a further aspect the present invention provides a stabilised halogen-containing polymer or polymer composition or formulation which comprises a halogen-containing polymer or polymer composition and a stabilizer composition as hereinbefore defined comprising organotin derivatives (a) and (b) and in which stabilized resin the stabilizer composition is present in a quantity up to about 5 parts by weight of the resin, and preferably from 1 to 3 parts by weight of the resin.

In yet a further aspect the present invention provides a composition comprising in admixture a polymer formulation comprising at least one halogen containing polymer and a stabilizer composition as hereinbefore defined comprising organotin derivatives (a) and (b). Preferably in such a mixture the stabilizer composition is present in a quantity up to about 5 parts by weight of the resin, and preferably from 1 to 3 parts by weight of the resin.

Thus stabilizer (a) may be present in the halogen-containing polymer in an amount of from about 1.0 to about 4.9 parts by weight per 100 parts by weight of the polymer. On the same weight bases stabilizer (b) may

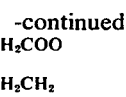

be present in from about 0.1 to about 4.0 parts by weight.

In yet a further aspect the present invention provides a method of fabricating an article made of a plastics material in which the halogen-containing polymer or polymer formulation is stabilized with a stabilizing composition comprising organotin derivatives (a) and (b) as hereinbefore defined.

Examples of stabilizer (a) are:

Dibutyltin bis (isooctyl thioglycollate), di octyltin bis(isooctyl β mercapto propionate), dimethyltin bis lauryl mercaptide, dibutyltin bis(methyl maleate), dibutyltin dilaurate, dibutyltin maleate, monobutyltin tris (isooctyl thioglycollate), mono octyltin tris (lauryl mercaptide), mono methyltin tris (butyl thioglycollate), dibutyltin thioglycollate, and dibutyltin bis(ethylene glycol thioglycollate).

Examples of stabilizer (b) are:

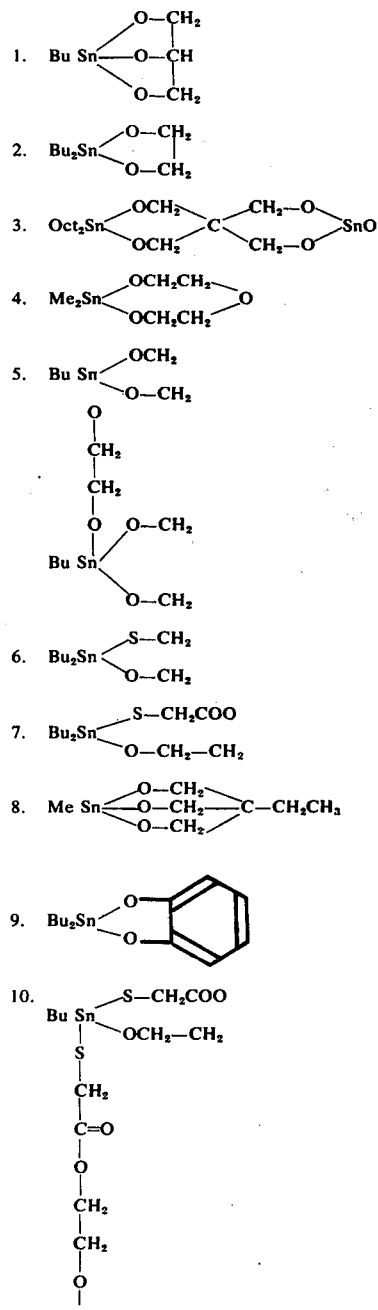

-continued

Bu Sn$\big<^{S-CH_2COO}_{O-CH_2CH_2}$

The composition according to the present invention may be used to particular advantage with polymers or polymer compositions or formulations comprising polyvinyl chloride.

The present invention will be described more particularly with reference to the following examples which demonstrate the improvements in stability of a halogen-containing polymer brought about by incorporation therein of the stabilizer compositions of the present invention. The examples also demonstrate the synergistic properties of the two stabilizer components in improving the stability of a halogen-containing polymer.

In all the following examples the formulation:

| | |
|---|---|
| P.V.C. | 100 |
| Glyceryl mono ricinoleate | 1.0 |
| Stabilizer | 2.0 | was mixed together on a two roll laboratory mill at 155°C. for 5 minutes until thoroughly homogenised. The resulting sheet was then taken from the roll at a thickness of 0.05 inches and samples were heated in an air circulation oven at 185°C. and withdrawn at 10 minute intervals. These samples were examined visually for rate of colour development, thus being taken as representative of the rate of decomposition of the P.V.C. compound. The following tables illustrate the results by showing the time taken for the P.V.C. samples to develop specific colours.

EXAMPLE 1

In this example the first stabilizer (a) is dibutyltin bis (iso-octyl thioglycollate) and the second stabilizer (b) is monobutyltin ethylene glyoxide which is No. 5 in the list of typical second stabilizers.

The second stabilizer was prepared as follows:

| | |
|---|---|
| Mono butyltin oxide | (83.2g, 0.4 mole) |
| Ethylene glycol | (37.2g, 0.6 mole) |
| Toluene | (200 ml.), | were refluxed until water (14.4g.) was removed. The toluene was removed on a rota vapour to give the product as a white crystalline solid in 98% yield.

| PARTS OF STABILISER | | TIME IN MINUTES TO SPECIFIC COLOUR | | |
|---|---|---|---|---|
| FIRST STABILISER | SECOND STABILISER | FAINT YELLOW | AMBER | BLACK |
| 2.0 | 0.0 | 30 | 60 | 70 |
| 1.9 | 0.1 | 60 | 70 | 80 |
| 1.8 | 0.2 | 50 | 70 | 80 |
| 1.6 | 0.4 | 50 | 60 | 70 |
| 1.4 | 0.6 | 40 | 60 | 70 |
| 0 | 2.0 | 20 | 30 | 50 |

It can be seen from Table 1 that a peak in the synergistic effect is reached in this instance with approximately 10% of the second stabilizer. The first stabilizer was prepared by conventional methods well known in the art.

EXAMPLE 2

Example 2 was carried out in a similar way to Example 1 but the first stabilizer is dibutyltin bis(iso-octyl thioglycollate) and the second stabilizer is the mono butyltin salt of ethylene glycol thioglycollate. The second stabilizer is therefore number 10 on the list of typical second stabilizers. In this instance a peak in stability is shown with approximately 0.2 parts of the second stabilizer with 1.8 parts of the first stabilizer.

| PARTS OF STABILISER | | TIME IN MINUTES TO SPECIFIC COLOUR | | |
|---|---|---|---|---|
| FIRST STABILISER | SECOND STABILISER | FAINT YELLOW | AMBER | BLACK |
| 2.0 | 0 | 30 | 60 | 70 |
| 1.8 | 0.2 | 60 | 70 | 80 |
| 1.6 | 0.4 | 60 | 70 | 80 |
| 1.4 | 0.6 | 50 | 60 | 70 |
| 1.2 | 0.8 | 40 | 50 | 60 |
| 0 | 2.0 | 20 | 30 | 40 |

The second stabilizer was made by the following method:

| Mono butyltin oxide | (83.2g, 0.4 moles) |
|---|---|
| Ethylene glycol thioglycollate | (81.6g, 0.6 moles) |
| Toluene | (200 mls.) | were refluxed until water (14.4g.) was removed. The toluene was removed on a rota vapour to give the product as a white crystalline solid.

EXAMPLE 3

In Example 3, the first stabilizer was dibutyltin bis-(iso-octyl thioglycollate) and the second stabilizer was the mono butyltin salt of glycerol. The second stabilizer was therefore No. 1 on the Table of typical second stabilizers.

| PARTS OF STABILISER | | TIME IM MINUTES TO SPECIFIC COLOUR | | |
|---|---|---|---|---|
| FIRST STABILISER | SECOND STABILISER | FAINT YELLOW | AMBER | BLACK |
| 2.0 | 0 | 30 | 60 | 70 |
| 1.8 | 0.2 | 70 | 80 | 90 |
| 1.6 | 0.4 | 70 | 80 | 90 |
| 1.4 | 0.8 | 60 | 80 | 90 |
| 1.0 | 1.0 | 50 | 70 | 80 |
| 0 | 2.0 | 30 | 40 | 50 |

It can be seen that the peak of the synergistic effect extends over the range of 10 to 20% of the second stabilizer in the mixture.

| Mono butyltin oxide | (104g, 0.5 moles), |
|---|---|
| Glycerol | (46g, 0.5 moles), |
| Toluene | (300 mls.) | were heated under reflux until water (18g.) had been removed. Toluene was removed on a rota vapour to give the product in 98% yield as a white crystalline solid.

EXAMPLE 4

The first stabilizer is mono butyltin sulphide, and the second stabilizer is the dibutyltin analogue of Compound No. 3 in the foregoing list of typical stabilizers (b):

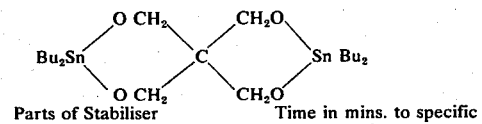

| Parts of Stabiliser | | Time in mins. to specific colour | | |
|---|---|---|---|---|
| First Stabiliser | Second Stabiliser | Faint Yellow | Amber | Black |
| 2.0 | 0 | 20 | 40 | 60 |
| 1.8 | 0.2 | 30 | 40 | 60 |
| 1.6 | 0.4 | 40 | 50 | 70 |
| 1.2 | 0.8 | 40 | 60 | 80 |
| 1.0 | 1.0 | 50 | 60 | 80 |
| 0.6 | 1.4 | 40 | 60 | 80 |
| 0.4 | 1.6 | 30 | 60 | 70 |
| 0 | 2.0 | 30 | 40 | 50 |

It can be seen that the peak synergistic effect occurs at approximately 1:1 weight.

EXAMPLE 5

The first stabilizer is dibutyltin bis (iso octylthioglycollate), and the second stabilizer is the monobutyltin salt of diethylene glycol, i.e.

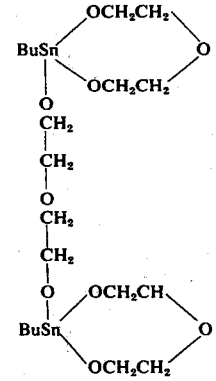

| Parts of Stabiliser | | Time in mins. to specific Colour | | |
|---|---|---|---|---|
| First Stabiliser | Second Stabiliser | Faint Yellow | Amber | Black |
| 2.0 | 0 | 30 | 60 | 70 |
| 1.8 | 0.2 | 80 | 90 | 100 |
| 1.6 | 0.4 | 60 | 70 | 80 |
| 1.4 | 0.6 | 50 | 70 | 80 |
| 1.2 | 0.8 | 50 | 60 | 70 |
| 1.0 | 1.0 | 50 | 60 | 70 |
| 0.8 | 1.2 | 40 | 50 | 70 |
| 0.6 | 1.4 | 40 | 50 | 60 |
| 0.4 | 1.6 | 40 | 50 | 60 |
| 0 | 2.0 | 20 | 40 | 60 |

The optimum ratio occurs here at 90% of Stabiliser 1 and 10% of the second stabilizer.

EXAMPLE 6

The first stabilizer is dibutyltin dilaurate, and the second stabilizer is monobutyltin glyceroxide, which is number 1 in the foregoing list of typical second stabilizers.

| Parts of Stabiliser | | Time in mins. to specific Colour | | |
|---|---|---|---|---|
| First Stabiliser | Second Stabiliser | Pale Yellow | Amber | Black |
| 2.0 | 0 | 20 | 40 | 70 |

-continued

| Parts of Stabiliser | | Time in mins. to specific Colour | | |
|---|---|---|---|---|
| First Stabiliser | Second Stabiliser | Pale Yellow | Amber | Black |
| 1.8 | 0.2 | 30 | 40 | 70 |
| 1.4 | 0.6 | 40 | 50 | 80 |
| 1.0 | 1.0 | 40 | 50 | 80 |
| 0.6 | 0.4 | 30 | 40 | 80 |
| 0 | 2.0 | 20 | 40 | 70 |

The optimum performance occurs at 50 to 70% of the first stabilizer.

EXAMPLE 7

The first stabilizer is dibutyltin dilaurate and the second stabilizer is the monobutyltin salt of ethylene glycol thioglycollate, namely Number 10 in the list of typical second stabilizers.

The optimum performance occurs at 90% of the first stabilizer.

| Parts of Stabiliser | | Time in min. to specific Colour | | |
|---|---|---|---|---|
| First Stabiliser | Second Stabiliser | Pale Yellow | Amber | Black |
| 2.0 | 0 | 20 | 40 | 70 |
| 1.9 | 0.1 | 40 | 60 | 80 |
| 1.8 | 0.2 | 50 | 70 | 80 |
| 1.6 | 0.4 | 40 | 60 | 80 |
| 1.0 | 1.0 | 30 | 50 | 70 |
| 0.6 | 1.4 | 30 | 40 | 60 |
| 0 | 2.0 | 20 | 30 | 40 |

EXAMPLE 8

The first stabilizer is monobutyltin tris, iso-octyl thioglycollate, and the second stabilizer is the dibutyltin salt of pentaerylthritol, namely the second stabilizer of Example 4.

| Parts of Stabiliser | | Time in mins. to specific Colour | | |
|---|---|---|---|---|
| First Stabiliser | Second Stabiliser | Pale Yellow | Amber | Black |
| 2.0 | 0.0 | 50 | 60 | 70 |
| 1.8 | 0.2 | 50 | 60 | 70 |
| 1.6 | 0.4 | 50 | 60 | 70 |
| 1.4 | 0.6 | 50 | 60 | 70 |
| 1.0 | 1.0 | 60 | 70 | 80 |
| 0.8 | 1.2 | 30 | 40 | 50 |
| 0.4 | 1.6 | 30 | 40 | 50 |
| 0 | 2.0 | 20 | 40 | 50 |

The peak performance occurs from 40 to 50% of the first stabilizer.

EXAMPLE 9

The first stabilizer is monobutyltin tris, iso octyl thioglycollate, and the second stabilizer is dibutyltin ethylene glyoxide, namely Number 2 on the list of typical second stabilizers.

| Parts of Stabiliser | | Time in mins. to specific Colour | | |
|---|---|---|---|---|
| First Stabiliser | Second Stabiliser | Pale Yellow | Amber | Black |
| 2.0 | 0 | 50 | 60 | 70 |
| 1.8 | 0.2 | 60 | 70 | 80 |
| 1.6 | 0.4 | 60 | 70 | 80 |

-continued

| Parts of Stabiliser | | Time in mins. to specific Colour | | |
|---|---|---|---|---|
| First Stabiliser | Second Stabiliser | Pale Yellow | Amber | Black |
| 1.4 | 0.6 | 60 | 80 | 90 |
| 1.2 | 0.8 | 60 | 80 | 90 |
| 1.0 | 1.0 | 70 | 80 | 90 |
| 0.8 | 1.2 | 50 | 60 | 80 |
| 0.6 | 1.4 | 40 | 50 | 60 |
| 0.2 | 1.8 | 30 | 40 | 50 |
| 0 | 2.0 | 20 | 30 | 40 |

The peak performance occurs at approximately 1:1 weight.

EXAMPLE 10

The first stabiliser is dioctyltin β-mercapto propionate, and the second stabiliser is the monobutyltin salt of glycerol.

| Parts of Stabiliser | | Time in Minutes to Specific colour | | |
|---|---|---|---|---|
| First Stabiliser | Second Stabiliser | Faint Yellow | Amber | Black |
| 2.0 | 0 | 40 | 50 | 60 |
| 1.8 | 0.2 | 40 | 60 | 70 |
| 1.6 | 0.4 | 50 | 70 | 80 |
| 1.4 | 0.6 | 40 | 60 | 70 |
| 1.2 | 0.8 | 40 | 50 | 60 |
| 0 | 2.0 | 30 | 40 | 50 |

It can be seen that the peak synergistic effect occurs at 20% of the second stabiliser.

EXAMPLE 11

The first stabiliser is dioctyltin β-mercapto propionate and the second stabiliser is the monobutyltin salt of ethylene glycol thioglycollate.

| Parts of Stabiliser | | Time in Minutes to Specific colour | | |
|---|---|---|---|---|
| First Stabiliser | Second Stabiliser | Faint Yellow | Amber | Black |
| 2.0 | 0 | 40 | 50 | 60 |
| 1.8 | 0.2 | 30 | 70 | 80 |
| 1.6 | 0.4 | 40 | 60 | 70 |
| 1.4 | 0.6 | 40 | 50 | 60 |
| 1.2 | 0.8 | 30 | 40 | 50 |
| 0 | 2.0 | 20 | 30 | 40 |

It can be seen that the peak synergistic effect occurs at 10% of the second stabiliser.

EXAMPLE 12

The first stabiliser is dibutyltin bis methylmaleate the second stabiliser is the monobutyltin salt of ethylene glycol thioglycollate.

| Parts of Stabiliser | | Time in Minutes to Specific colour | | |
|---|---|---|---|---|
| First Stabiliser | Second Stabiliser | Faint Yellow | Amber | Black |
| 2.0 | 0 | 40 | 50 | 70 |
| 1.8 | 0.2 | 40 | 50 | 80 |
| 1.6 | 0.4 | 50 | 60 | 80 |
| 1.4 | 0.6 | 40 | 50 | 70 |
| 1.2 | 0.8 | 30 | 40 | 50 |

-continued

| Parts of Stabiliser | | Time in Minutes to Specific colour | | |
|---|---|---|---|---|
| First Stabiliser | Second Stabiliser | Faint Yellow | Amber | Black |
| 0 | 2.0 | 20 | 30 | 40 |

It can be seen that the peak synergistic effect occurs at 20% of the second stabiliser.

EXAMPLE 13

The first stabiliser is dibutyltin bis lauryl mercaptide and the second stabiliser is the monobutyltin salt of glycerol.

| Parts of Stabiliser | | Time in Minutes to Specific colour | | |
|---|---|---|---|---|
| First Stabiliser | Second Stabiliser | Faint Yellow | Amber | Black |
| 2.0 | 0 | 30 | 40 | 50 |
| 1.8 | 0.2 | 40 | 50 | 60 |
| 1.6 | 0.4 | 50 | 70 | 80 |
| 1.4 | 0.6 | 50 | 60 | 70 |
| 1.2 | 0.8 | 40 | 50 | 60 |
| 0 | 2.0 | 30 | 40 | 50 |

It can be seen that the peak synergistic effect occurs at 20% of the second stabiliser.

EXAMPLE 14

The first stabiliser is dibutyltin bis lauryl mercaptide and the second stabiliser is the monobutyltin salt of ethylene glycol thioglycollate.

| Parts of Stabiliser | | Time in Minutes to Specific colour | | |
|---|---|---|---|---|
| First Stabiliser | Second Stabiliser | Faint Yellow | Amber | Black |
| 2.0 | 0 | 30 | 40 | 50 |
| 1.8 | 0.2 | 50 | 60 | 70 |
| 1.6 | 0.4 | 60 | 70 | 80 |
| 1.4 | 0.6 | 40 | 50 | 60 |
| 1.2 | 0.8 | 30 | 40 | 50 |
| 0 | 2.0 | 20 | 30 | 40 |

It can be seen that the peak synergistic effect occurs at 20% of the second stabiliser.

EXAMPLE 15

The first stabiliser is dibutyltin maleate and the second stabiliser is the monobutyltin salt of ethylene glycol thioglycollate.

| Parts of Stabiliser | | Time in Minutes to Specific colour | | |
|---|---|---|---|---|
| First Stabiliser | Second Stabiliser | Faint Yellow | Amber | Black |
| 2.0 | 0 | 20 | 30 | 50 |
| 1.8 | 0.2 | 30 | 30 | 60 |
| 1.6 | 0.4 | 30 | 40 | 70 |
| 1.4 | 0.6 | 40 | 50 | 70 |
| 1.2 | 0.8 | 30 | 50 | 70 |
| 0 | 2.0 | 20 | 30 | 40 |

It can be seen that the peak synergistic effect occurs at 20% of the second stabiliser.

We claim:

1. A composition comprising a halogen-containing resin and a stabilizing synergistic mixture of from 0.05 up to 5 parts by weight per 100 parts by weight of the resin of:

a first stabiliser (a) having the formula $R_x \text{Sn} Z (4-x)$ where $x = 1, 2$ or $3$, Z represents an anion selected from the group consisting of $-S(CH_2)_n COOR'$ where $n = 1$ or $2$,

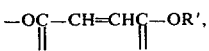

and — S —, and, in addition, where $x = 2$,

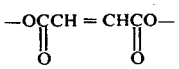

and — $S(CH_2)_2 COO$ —, R represents a radical selected from the group consisting of alkyl containing 1 to 18 carbon atoms, cycloalkyl, aryl, aralkyl and alkaryl, and R' represents a radical selected from the group consisting of the radicals represented by R and the residue of a polyol containing 2 to 6 hydroxyl radicals;

a second stabilizer (b) selected from the group consisting of

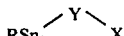

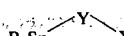

where R has the above meaning, X represents the residue of a polyol containing 2 to 6 hydroxyl radicals and Y represents oxygen or sulphur.

2. The composition of claim 1 in which the stabilising synergistic mixture is present in an amount of from 1 to 3 parts by weight per 100 parts by weight of the resin.

3. The composition of claim 1 in which the residue X contains groups selected from the group consisting of ether, ester, alkene, amide and sulphide.

4. The composition of claim 1 wherein the halogen-containing compound is polyvinyl chloride.

5. In a process for stabilizing a resin which contains labile chlorine against the loss of chlorine when the resin is heated, the step which comprises mixing with the resin a stabilizing amount of a mixture containing a compound of the formula $$R_x Sn\ Z\ (4-x)$$

and a compound selected from the group consisting of

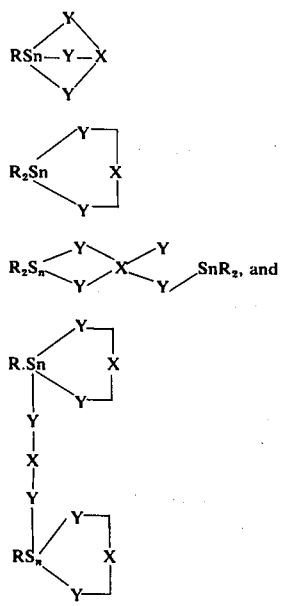

wherein R represents a radical selected from the group consisting of alkyl containing 1 to 18 carbon atoms, cycloalkyl, aryl, aralkyl and alkaryl, X represents the residue of a polyol containing 2 to 6 hydroxyl radicals, Y represents oxygen or sulphur, and $x=1$, 2 or 3.

6. A stabilizer composition adapted to counteract the deteriorative effect of heat on a halogen-containing resin comprising a synergistic mixture of:

a first stabilizer (a) having the formula $R_x Sn\ Z\ (4-x)$ where $x=1$, 2 or 3, Z represents an anion selected from the group consisting of —S $(CH_2)_n COOR'$ where $n=1$ or 2,

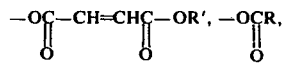

— SR and — S —, and, in addition, where $x=2$,

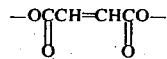

and — S $(CH_2)_2 COO$—, R represents a radical selected from the group consisting of alkyl containing 1 to 18 carbon atoms, cycloalkyl, aryl, aralkyl and alkaryl, and R' represents a radical selected from the group consisting of the radicals represented by R and the residue of a polyol containing 2 to 6 hydroxyl radicals;

a second stabilizer (b) selected from the group consisting of

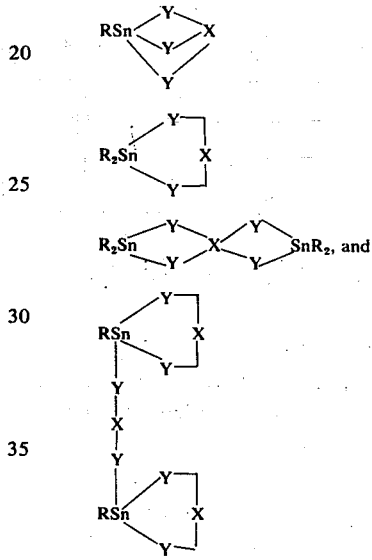

where R has the above meaning, X represents the residue of a polyol containing 2 to 6 hydroxyl radicals and Y represents oxygen or sulphur.

7. The stabilizing composition of claim 6 in which (a) or (b) is a monoalkyl derivative and the other is a dialkyl derivative.

8. The stabilizing composition of claim 6 in which the residue X contains groups selected from the group consisting of ether, ester, alkene, amide and sulphide.

* * * * *

UNITED STATES PATENT AND TRADEMARK OFFICE
CERTIFICATE OF CORRECTION

PATENT NO. : 3,969,319
DATED : July 13, 1976
INVENTOR(S) : Ronald Eric Hutton, Vincent Oakes, Brain Rodney Iles It is certified that error appears in the above-identified patent and that said Letters Patent are hereby corrected as shown below:

In the Abstract, right hand column, line 3, the formula should be read $R_x$ Sn Z (4-x)

In the Specifications:

Column 2, the formula at lines 18-19 should be read

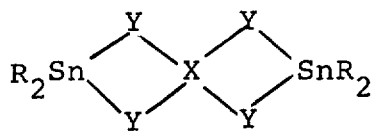

Column 2, the formula at lines 20-28 should be read

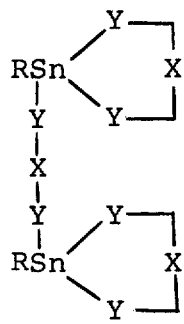

UNITED STATES PATENT AND TRADEMARK OFFICE
CERTIFICATE OF CORRECTION

PATENT NO. : 3,969,319
DATED : July 13, 1976
INVENTOR(S) : Ronald Eric Hutton, Vincent Oakes, Brian Rodney Iles It is certified that error appears in the above-identified patent and that said Letters Patent are hereby corrected as shown below:

Column 3, Formula 5 between lines 34-43 should be read

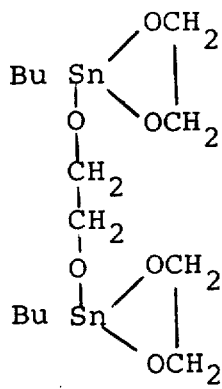

Column 3, Formula 6 between lines 44-46 should be read

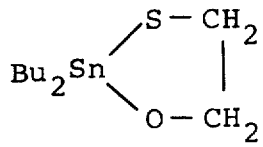

Column 3, Formula 7 between lines 47-49 should be read

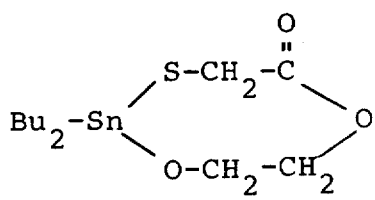

UNITED STATES PATENT AND TRADEMARK OFFICE
CERTIFICATE OF CORRECTION

PATENT NO. : 3,969,319
DATED : July 13, 1976
INVENTOR(S) : Ronald Eric Hutton, Vincent Oakes, Brain Rodney Ile It is certified that error appears in the above-identified patent and that said Letters Patent are hereby corrected as shown below:

Columns 3 and 4, Formula 10 between lines 57-4 should be read

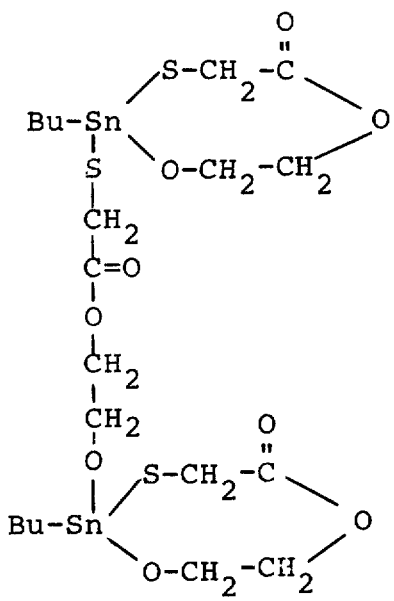

Column 7, line 39 change "pentaerylthritol" to
---pentaerythritol---

In the Claims:

Claim 1, line 13 should be read -OCR, -SR 

Page 4 of 4

UNITED STATES PATENT AND TRADEMARK OFFICE
CERTIFICATE OF CORRECTION

PATENT NO. : 3,969,319
DATED : July 13, 1976
INVENTOR(S) : Ronald Eric Hutton, Vincent Oakes, Brian Rodney Iles It is certified that error appears in the above-identified patent and that said Letters Patent are hereby corrected as shown below:

Claim 5, the formula between lines 20-25 should be read

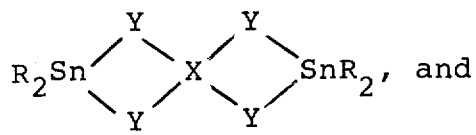, and

Claim 5, the formula between lines 25-35 should be read

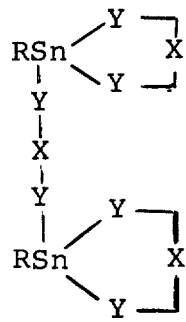

Signed and Sealed this

Sixteenth Day of November 1976

[SEAL]

Attest:

RUTH C. MASON
Attesting Officer

C. MARSHALL DANN
Commissioner of Patents and Trademarks